(12) United States Patent
Enomoto et al.

(10) Patent No.: US 6,884,541 B2
(45) Date of Patent: Apr. 26, 2005

(54) LITHIUM SECONDARY BATTERY AND MANUFACTURING METHOD THEREOF

(75) Inventors: Akio Enomoto, Nagoya (JP); Kenji Kawamura, Nagoya (JP); Kenshin Kitoh, Nagoya (JP); Toshihiro Yoshida, Nagoya (JP)

(73) Assignee: NGK Insulators, Ltd., Nagoya City (JP)

( * ) Notice: Subject to any disclaimer, the term of this patent is extended or adjusted under 35 U.S.C. 154(b) by 557 days.

(21) Appl. No.: 09/937,943

(22) PCT Filed: Feb. 8, 2001

(86) PCT No.: PCT/JP01/00872

§ 371 (c)(1),
(2), (4) Date: Oct. 2, 2001

(87) PCT Pub. No.: WO01/59856

PCT Pub. Date: Aug. 16, 2001

(65) Prior Publication Data

US 2003/0035993 A1 Feb. 20, 2003

(30) Foreign Application Priority Data

Feb. 9, 2000 (JP) ........................................ 2000-032381
Aug. 29, 2000 (JP) ........................................ 2000-259587

(51) Int. Cl.$^7$ .............................................. H01M 2/04
(52) U.S. Cl. ........................ 429/163; 429/164; 429/177; 429/185; 29/623.1
(58) Field of Search .......................... 429/231.9, 174, 429/231.95, 163, 164, 170, 171, 173, 165–169, 175–185; 29/623.1, 623, 624

(56) References Cited

U.S. PATENT DOCUMENTS 1,388,850 A * 8/1921 Cook ........................... 429/164
2,057,790 A * 10/1936 Potter et al. .............. 361/301.1
2,665,329 A * 1/1954 Brennan ...................... 174/52.3
3,354,359 A * 11/1967 Ford ............................ 361/520

(Continued)

FOREIGN PATENT DOCUMENTS

| EP | 0 964 469 A2 | 12/1999 |
|---|---|---|
| JP | 56-35367 | * 4/1981 |
| JP | 4-144054 | 5/1992 |
| JP | 9-92241 | 4/1997 |
| JP | 10-27584 | 1/1998 |
| JP | 2000-285875 A | 10/2000 |

OTHER PUBLICATIONS

U.S. Appl. No. 09/169,563, filed Oct. 9, 1998, Kitoh et al.
U.S. Appl. No. 09/327,819, filed Jun. 8, 1999, Kitoh et al.
U.S. Appl. No. 09/579,898, filed May 26, 2000, Nemoto et al.
U.S. Appl. No. 09/819,329, filed Mar. 28, 2001, Enomoto et al.
U.S. Appl. No. 09/114,323, filed Jul. 13, 1998, Nemoto et al.
U.S. Appl. No. 09/870,372, filed May 30, 2001, Nemoto et al.
U.S. Appl. No. 29/102,816, filed Apr. 1, 1999, Kitoh et al.

Primary Examiner—Frankie L. Stinson
(74) Attorney, Agent, or Firm—Burr & Brown

(57) ABSTRACT

A lithium secondary battery includes a cylindrical battery case provided with electrode caps at both end portions thereof. An electrode body impregnated with a nonaqueous electrolyte solution is contained in the battery case and includes a positive electrode, a negative electrode, and a separator, with the positive electrode and the negative electrode being wound or laminated through the separator. An elastic body is disposed between the battery case and the electrode caps, with portions in which the battery case contacts the elastic body being brought into press-contact to form a caulked portion to seal the battery case. $R_{body}$(mm) is a diameter of a body part of the battery case and $R_{top}$(mm) is a diameter of the caulked portion, wherein $R_{body}$ and $R_{top}$ fulfill a relationship of $R_{body} > R_{top}$.

24 Claims, 12 Drawing Sheets

U.S. PATENT DOCUMENTS

| | | | | |
|---|---|---|---|---|
| 3,503,806 A | * | 3/1970 | Sugalski | 429/55 |
| 3,957,538 A | * | 5/1976 | Fairweather et al. | 429/171 |
| 4,053,687 A | * | 10/1977 | Coibion et al. | 429/94 |
| 4,107,403 A | * | 8/1978 | Takamura et al. | 429/174 |
| 5,370,711 A | * | 12/1994 | Audit et al. | 29/623.1 |
| 5,571,632 A | * | 11/1996 | Teramoto | 429/94 |
| 5,677,076 A | * | 10/1997 | Sato et al. | 429/56 |
| 5,736,270 A | * | 4/1998 | Suzuki et al. | 429/94 |
| 5,849,431 A | * | 12/1998 | Kita et al. | 429/164 |
| 5,958,620 A | * | 9/1999 | Nagaura | 429/164 |
| 6,081,992 A | * | 7/2000 | Kelemen et al. | 29/623.1 |
| 6,114,059 A | * | 9/2000 | Watanabe et al. | 429/120 |
| 6,197,074 B1 | * | 3/2001 | Satou et al. | 29/623.1 |
| 6,248,472 B1 | * | 6/2001 | Kelemen | 429/163 |
| 6,402,794 B1 | * | 6/2002 | Malay | 29/623.2 |
| 6,410,186 B1 | * | 6/2002 | Tucholski et al. | 429/174 |
| 6,500,575 B1 | * | 12/2002 | Shiue et al. | 429/27 |
| 6,521,374 B1 | * | 2/2003 | Nakanishi et al. | 429/178 |
| 6,593,026 B1 | * | 7/2003 | Tukawaki et al. | 429/90 |
| 6,733,925 B2 | * | 5/2004 | Hironaka et al. | 429/231.95 |
| 2002/0045096 A1 | * | 4/2002 | Sandberg et al. | |

* cited by examiner

OR

OR

OR

OR

LITHIUM SECONDARY BATTERY AND MANUFACTURING METHOD THEREOF

TECHNICAL FIELD

The present invention relates to a lithium secondary battery (hereinafter to be referred to as "battery") as well as a manufacturing method thereof, and further in particular, a lithium secondary battery which is superior in long period stability and reliability as well as a manufacturing method thereof in which steps are simple and superior in productivity.

BACKGROUND ART

In recent years, lithium secondary batteries are widely used as a power source for electronic equipment such as portable communication equipment and a notebook-sized personal computer. In addition, requests for resource saving and energy saving are raised for international protection of the earth environment, and the lithium secondary battery is being developed as an engine driving or motor driving battery for an electric vehicle, or a hybrid electric vehicle, (hereinafter also to be referred to as "selectric vehicle, etc.").

Conventionally, a lithium secondary battery is sealed by bonding a tip portion of a battery case containing an electrode body inside with an outer periphery portion of an electrode cap, and this bonding is formed by a method of caulking and/or welding. This battery is caulked (reference should be made to Japanese Patent Laid-Open No. 9-92241 etc.) so that, as shown in FIG. 2 and FIG. 5, a diameter $R_{body}$ of a body part of a battery case 16 as well as a diameter $R_{top}$ of a caulked portion thereof have the same size.

However, as shown in FIG. 2, when the diameter $R_{body}$ of the body part of the battery case 16 as well as the diameter $R_{top}$ of a caulked portion thereof are formed to have the same size with a packing 23 provided between the battery case 16 and the electrode cap, pressure is not applied to the packing 23 equally, a gap is created between the battery case 16 and the electrode cap, this gap functions as a path for an electrolyte solution, and through this path, the electrolyte solution existing in the body part of the battery case will leak, which gives rise to a problem.

In addition, as shown in FIG. 5, when the tip portion of the battery case 16 is joined with the outer periphery portion of the electrode cap by welding, and the diameter $R_{body}$ of the body part of the battery case 16 and the diameter $R_{top}$ of the caulked portion are formed to have the same size, adhesiveness of the battery case 16 and the outer periphery portion of the electrode cap 15A themselves are weak and the joining force thereof will be given only by welding. The battery formed by this method will not give rise to any problem in the case where it is used as a power source for electronic equipment such as communication apparatuses or computers, but it requires sufficient durability against vibrations taking place at the time of starting an engine or at the time of running the engine in the case where it is used as an engine driving or motor driving battery for an electric vehicle, etc., giving rise to a problem that it is difficult to hold long term sealing.

In addition, conventionally, a lithium secondary battery is produced by a manufacturing method in which, at first, an electrode body is inserted into a battery case and disposed at a stable position, the body part of the battery case is narrowed so that the gap between the battery case and the electrode body almost disappears, thereafter, an electrolyte solution is injected into the battery case, subsequently, an electrode cap is mounted at the opening part of the battery case, and the battery case and the outer periphery portion of the electrode cap are joined by squeezing and caulking to seal the battery (reference should be made to Japanese Patent Laid-Open No. 10-27584 etc.).

However, in the manufacturing method described in Japanese Patent Laid-Open No. 10-27584, the electrode body is impregnated with electrolyte solution and thereafter the battery case and the outer periphery portion of the electrode cap are joined by squeezing as well as caulking to seal the battery, and thereby the method has a problem that the electrolyte solution is lifted to the opening part from the body part of the battery case at the time when the battery case undergoes squeezing, the electrolyte solution enters the caulked portion, this electrolyte solution which enters forms a path in the caulked portion, and through this path the electrolyte solution existing in the body part of the battery case would leak.

The present invention has been achieved in view of such conventional problems, and an objective thereof is to provide a lithium secondary battery in which improvement in long period stability as well as reliability has been planned by intensifying the caulking between the battery case and the electrode cap and by removing the caulked gap between the battery case and the electrode cap so as to suppress leakage of the electrolyte solution.

In addition, another objective is to provide a lithium secondary battery in which improvement in long period stability as well as reliability has been planned by intensifying caulking between the battery case and the electrode cap and by welding the tip portion of the battery case with the outer periphery portion of the electrode cap so as to suppress leakage of the electrolyte solution.

In addition, still another objective is to provide a manufacturing method of the above-described lithium secondary battery in which manufacturing is simplified and improvement in productivity has been planned by making complicated operations such as joining operations, etc., inside the narrow battery case unnecessary and by using only selected good battery elements for the subsequent steps.

SUMMARY OF THE INVENTION

According to the present invention, there is provided a lithium secondary battery including: a cylindrical battery case provided with electrode caps at both end portions thereof; an electrode body impregnated with a nonaqueous electrolyte solution and contained in the battery case and including a positive electrode, a negative electrode, and a separator, the positive electrode and the negative electrode being wound or laminated through the separator; and moreover, an elastic body disposed between the above-described battery case and the above-described electrode caps wit portions where the above-described battery case contacts the above-described elastic body being brought into press-contact to form a caulked portion to seal the above-described battery case; wherein, with $R_{body}$(mm) being a diameter of a body part of the above-described battery case, $R_{top}$(mm) being a diameter of the above described caulked portion, $R_{body}$ and $R_{top}$ fulfill the relationship of $R_{body} < R_{top}$. At this time, a battery case is preferably made of Al or Al alloy.

In a lithium secondary battery of the present invention, with $\Delta R$(mm) being a difference between $R_{body}$(mm) and $R_{top}$(mm), $\Delta R$ preferably fulfills the relationship of $\Delta R \leq 5$ (mm), and the $R_{body}$ and the $\Delta R$ preferably fulfill the relationship of $(\Delta R/R_{body}) \times 100 \leq 10(\%)$.

In addition, with the caulked portion, the deformation quantity in the press-contacting direction of the press-contacted elastic body preferably is larger than spring-back quantity and the press-contact force applied to the elastic body is not more than the press-contact force with elasticity maintaining rate of the elastic body being not less than 95%. At this time, the elastic body is preferably made of any of ethylene propylene rubber, polyethylene, polypropylene and fluororesin. In addition, the electrode cap preferably comprises an electrolyte solution injection port.

In addition, according to the present invention, there is provided a lithium secondary battery, comprising: a cylindrical battery case provided with electrode caps at both end portions thereof; and an electrode body impregnated with a nonaqueous electrolyte solution and contained in the battery case and including a positive electrode, a negative electrode, and a separator, the positive electrode and the negative electrode plate being wound or laminated through the separator; wherein, tip portions of the above-described battery case and outer periphery portions of the above-described electrode caps are brought into joining by squeezing processing, caulking, and welding.

In addition, according to the present invention, there is provided a lithium secondary battery, including: a cylindrical battery case provided at both end portions thereof with electrode caps having battery caps, internal terminals and external terminals; and an electrode body impregnated with a nonaqueous electrolyte solution and contained in the battery case and including a positive electrode, a negative electrode, and a separator, the positive electrode and the negative electrode plate being wound or laminated through the separator; portions where the above-described battery case is in contact with the above-described electrode caps being brought into press-contact to form a caulked portions to execute sealing; in which, with $R_{body}$(mm) being a diameter of a body part of the above-described battery case, $R_{top}$(mm) being a diameter of the above-described caulked portion, $R_{body}$ and $R_{top}$ fulfill the relationship of $R_{body} > R_{top}$; and tip portions of the above-described battery case and outer periphery portions of the above-described electrode caps are brought into joining by welding. At this time, a battery case is preferably made of Al or Al alloy, and the battery cap and the external terminal are preferably made of Al or Al alloy.

In a lithium secondary battery of the present invention, with $\Delta R$(mm) being a difference between $R_{body}$(mm) and $R_{top}$(mm), $\Delta R$ preferably fulfills the relationship of $\Delta R < 5$ (mm), and the $R_{body}$ and the $\Delta R$ preferably fulfill the relationship of $(\Delta R/R_{body}) \times 100 \leq 10(\%)$. In addition, as for the shape of the battery case, it is preferably shaped as a pipe. Moreover, the entire area of the tip portion of the battery case and the electrode cap are preferably joined by welding, and a squeezed portion is preferably formed in the very vicinity of the outer periphery portion of the electrode cap.

The lithium secondary battery of the present invention is suitably adopted as a large size battery with battery capacity of 2 Ah or more. In addition, it is suitably adopted as a battery to be mounted on a vehicle and suitably used for an engine starting power source requiring high output, for an electric vehicle or a hybrid electric vehicle implementing large current discharge frequently.

Moreover, according to the present invention, there is provided a manufacturing method of a lithium secondary battery, comprising the steps of: forming a battery element by joining respective electricity collection tabs provided in both ends of an internal electrode body which is structured by coiling a positive electrode and a negative electrode via a separator around the outer periphery of a winding core and respective internal terminal portions of two electrode caps together; inserting the battery element into a battery case with both ends being left open; joining respective both end portions of the above-described battery case with respective outer periphery portions of the above-described two electrode caps; and injecting electrolyte solution from an electrolyte solution injection port provided in at least one electrode cap, and sealing the above-described electrolyte solution injection port.

In the lithium secondary battery of the present invention, it is preferable that respective both end portions of the battery case and respective outer periphery portions of the two electrode caps are joined, and at the same time, or therebefore/thereafter the electrode cap of the battery case undergoes squeezing in the very vicinity portion of the outer periphery portion, and that caulking and/or welding method is used as a method for joining the battery case and the electrode cap.

At the time of the caulking operation, it is preferable to arrange an elastic body between the battery case and the electrode cap, and the elastic body is preferably made of any of ethylene propylene rubber, polyethylene, polypropylene and fluororesin. At the time of the welding operation, a YAG laser is preferably used as an energy source. Moreover, as the battery case, it is preferable to use the one made of aluminum or aluminum alloy.

BRIEF DESCRIPTION OF THE DRAWINGS

FIG. 1(a) is a sectional view, and FIG. 1(b) is a partially enlarged view of FIG. 1(a).

FIG. 4(a) is a sectional view, and FIG. 4(b) is a partially enlarged view of FIG. 4(a).

DETAILED DESCRIPTION OF THE INVENTION

The present invention is largely divided into the first to the fourth inventions. Incidentally, the first to the third inventions relate to lithium secondary batteries, and the fourth invention relates to a manufacturing method of a lithium secondary battery. Embodiments of the present invention will be hereinbelow described, but it goes without saying that the present invention is not limited to these embodiments. Each invention will be described hereinbelow.

Figure 1A:
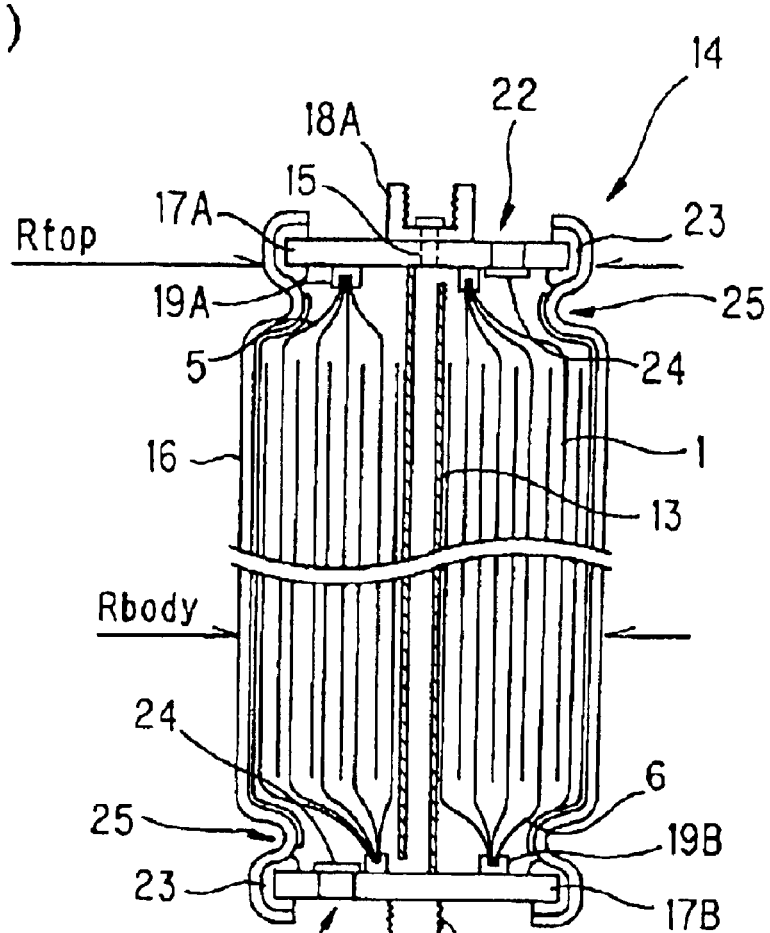
FIGS. 1(a) and 1(b) show a battery made of a lithium secondary battery of the present invention.
Figure 1B:
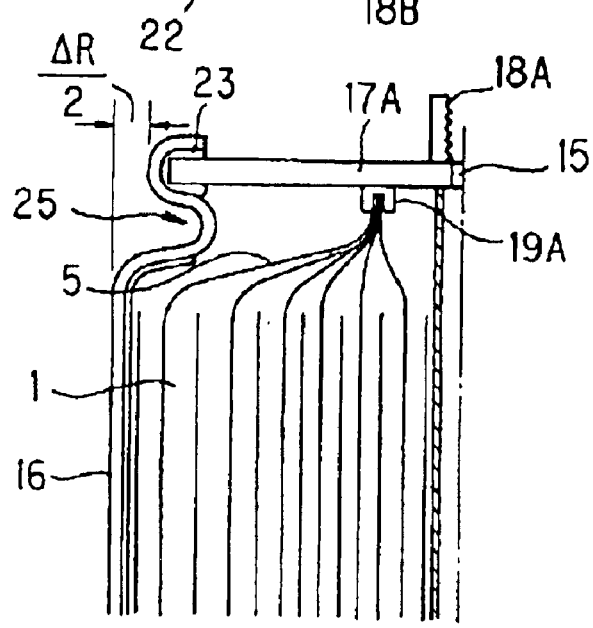
Figure 2:
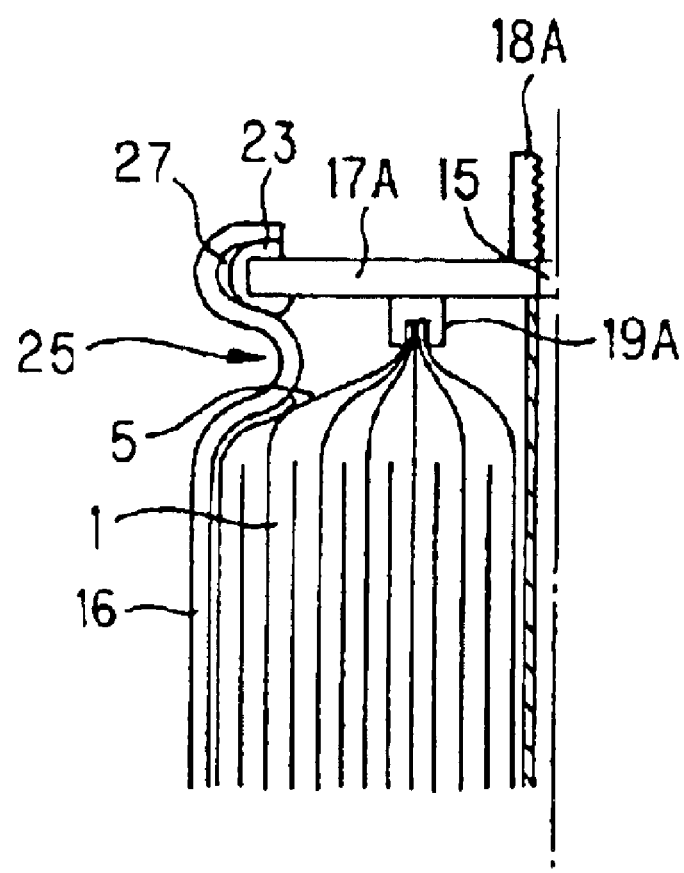
FIG. 2 is a sectional view showing an embodiment of a conventional lithium secondary battery.
Figure 3A:
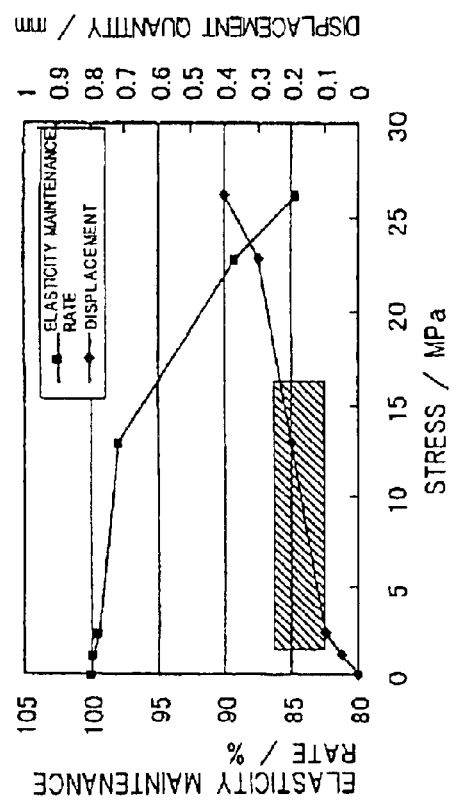
FIGS. 3(a) to 3(d) are explanatory views showing relationships between elasticity maintaining rates and displacement quantities on respective elastic bodies.
Figure 3B:
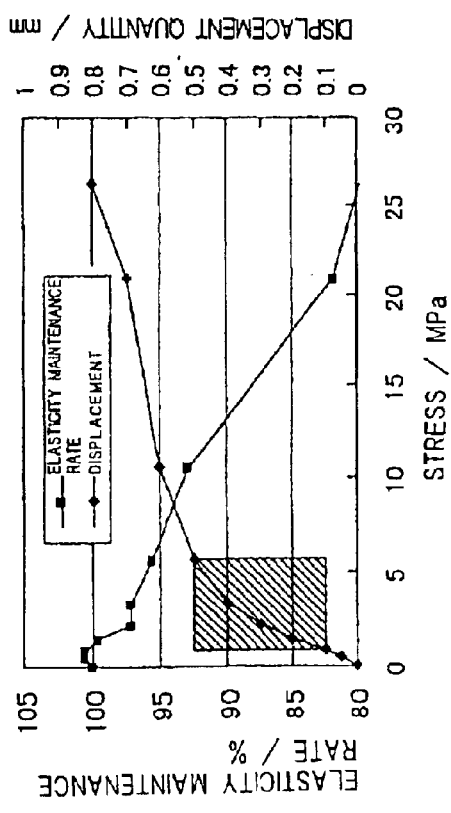
Figure 3C:
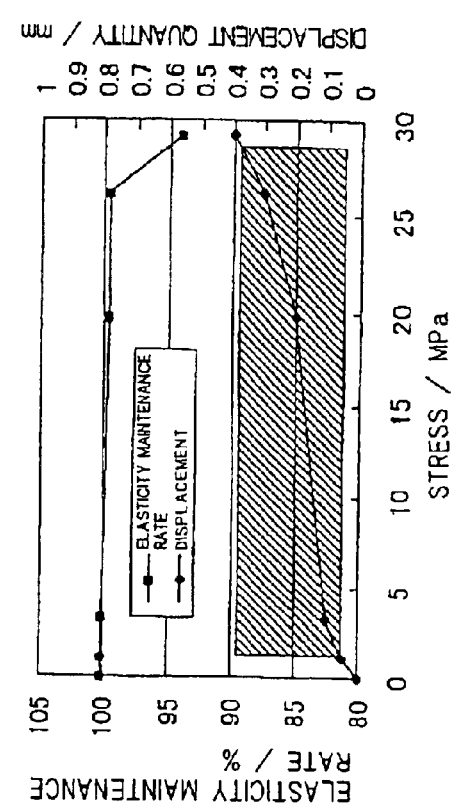
Figure 3D:
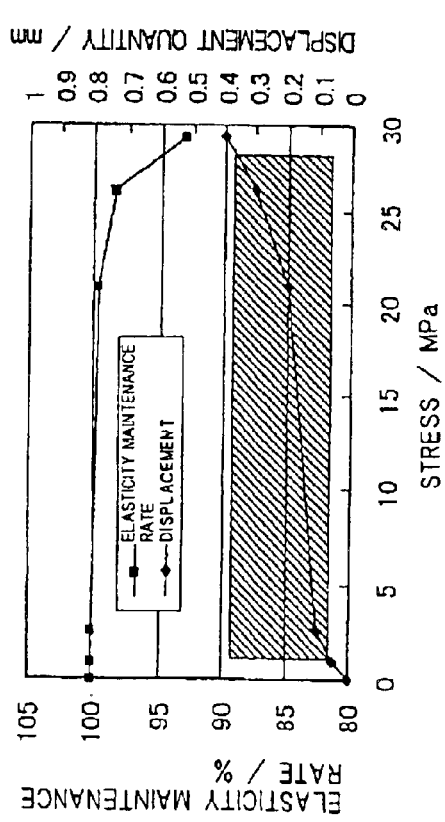

The first invention is a lithium secondary battery comprising a positive electrode, a negative electrode, the positive electrode and the negative electrode being wound or laminated via a separator to an electrode body which is impregnated with nonaqueous electrolyte solution, a cylindrical battery case containing the electrode body, electrode caps being disposed at both end portions of the battery case, and moreover, an elastic body being disposed between the battery case and the electrode cap, with the portion where the battery case is press-contacted with the elastic body to form a caulked portion with which the battery case is sealed, the battery being structured so that $R_{body}$ and $R_{top}$ fulfill the relationship of $R_{body} > R_{top}$, $R_{body}$(mm) being a diameter of the body part of the battery case and $R_{top}$(mm) being a diameter of the caulked portion. As shown in FIG. 1(a) and FIG. 1(b), within a range of intensity of a battery case 16, a positive electrode cap, a negative electrode cap, and an elastic body 23, the diameter $R_{body}$ of the body part of the battery case and the diameter $R_{top}$ of the caulked portion $R_{top}$ are caulked intensively to fulfill relationship of $R_{body} > R_{top}$ so that the caulked gap between the battery case 16 and the electrode cap is removed, and thereby leakage of electrolyte solution can be controlled.

At this time, the battery case is preferably made of Al or Al alloy. Battery cases made of such materials with various diameters are on the market, and therefore are easily available and inexpensive, and moreover, since materials such as Al, etc., are light, which enable to lighten batteries, and thus improvement in weight energy density as well as weight output density of batteries can be planned. Moreover, a feature of easy caulking, etc., also in molding the battery is given. Aluminum here refers to pure aluminum, but the one with purity of 90% or more can be used without any problems.

In the first invention, with $\Delta R$(mm) being a difference between $R_{body}$(mm) and $R_{top}$(mm), it is preferable that $\Delta R$ fulfills the relationship of $\Delta R \leq 5$(mm) while $R_{body}$ and $\Delta R$ fulfill the relationship of $(\Delta R/R_{body}) \times 100 \leq 10(\%)$. This comes from the later-described outcome of examples that caulking with a force not less than this gives rise to cracks in battery cases.

In addition, in the first invention, it is preferable that with the caulked portion, the deformation quantity in the press-contacting direction of the press-contacted elastic body preferably is larger than a spring-back quantity and that the press-contact force applied to the elastic body is to make not more than the press-contact force with an elasticity maintaining rate of the elastic body being not less than 95%. For this elastic body, a packing 23 corresponding with a shape of the electrode cap is used, as shown in FIG. 1(a), and the packing 23 will show elastic deformation with caulking. In the first invention, the internal electrode body 1 and the electrode cap are integrated by connection and are inserted into the battery case 16, with a battery case 16 being caulked to reach a certain point with the autograph, which position is treated as a reference, with displacement being monitored so that the load of press-contact is gradually made small, and the spring-back quantity refers to the displacement quantity from the reference position when the load has been completely released. At this time, if the deformation quantity in the direction of press-contact of the elastic body is larger than the spring-back quantity, no gap will take place even after caulking is finalized, and thereby, leakage of electrolyte solution is prevented.

In addition, the elasticity maintaining rate of the elastic body refers to changes in thickness before and after application of press-contact force when compression stress is applied to an elastic body of the outside diameter of 10 mm$\phi$×the inside diameter 7 mm$\phi$×1 mm with an autograph, and the compression stress is released after a predetermined time has lapsed. That is, with $A_1$ being thickness of the elastic body before application of the press-contact force and with $B_1$ being thickness of the elastic body after application of the press-contact force, the elasticity maintaining rate D can be expressed with $D = B_1/A_1 \times 100$.

FIGS. 3(a) to 3(d) are explanatory graphs showing the elasticity maintaining rate and the displacement quantity in terms of its relationship with the applied press-contact force with respect to respective elastic bodies processed to have sizes of the outside diameter 10 mm$\phi$×the inside diameter 7 mm$\phi$×1 mm ((a) ethylene propylene rubber, (b) fluoride resin, (c) polyethylene and (d) polypropylene), and shaded framed portions shown in the respective drawings are the suitable ranges of the present invention. That is, if the elasticity maintaining rate is 95% or more, elasticity is secured as well as the plane pressure is secured.

In addition, in the first invention, the electrode cap is preferably provided with an electrolyte solution injection port. The lithium secondary battery of the present invention can be manufactured as follows for example. At first the battery element compound of the battery cap and the internal electrode body to be integrated by tab press-attachment and welding is inserted into the battery case as a unitary structure. Then, squeezing processing as well as caulking processing is executed to close the battery. Subsequently, the internal electrode body is impregnated with the electrolyte solution from the electrolyte solution injection port provided in the battery cap, and then the injection port is capped. If the electrode cap is provided with an electrolyte solution injection port, the above-described manufacturing method can be adopted, and the electrolyte solution will be confined to the battery case body part, and together with deprivation of the above described caulked gap, possibility of leakage of electrolyte solution will almost disappear.

Next, a second invention will be described. The second invention is a lithium secondary battery comprising an electrode body having a positive electrode, a negative electrode, and a separator, with the positive electrode and the negative electrode being wound or laminated via the separator. The electrode body is impregnated with a nonaqueous electrolyte solution and contained in a cylindrical battery case having electrode caps at both the end portions, and the tip portion of the battery case and the outer periphery portion of the electrode caps are brought into joining by means of caulking, squeezing, and welding. Thus, the tip portion of the battery ease as well as the outer periphery portion of the electrode cap are caulked so that the battery case is tightly sealed, squeezed so that the electrode cap is positioned and fixed, welded so that leakage of electrolyte solution can be restricted to an extreme degree.

Figure 4A:
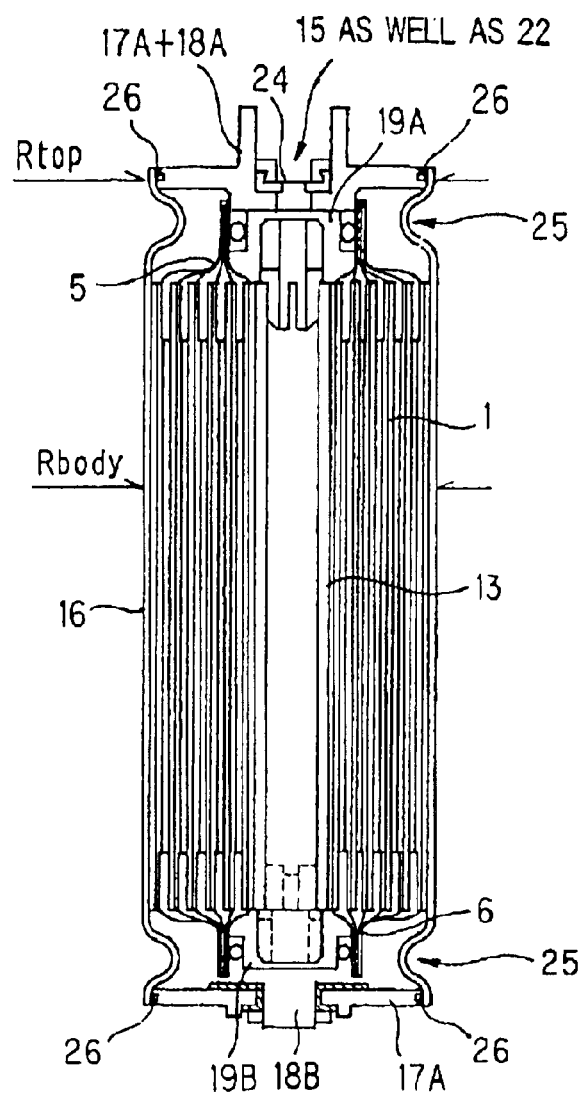
FIGS. 4(a) and 4(b) are views to show an embodiment of the lithium secondary battery of the present invention.
Figure 4B:
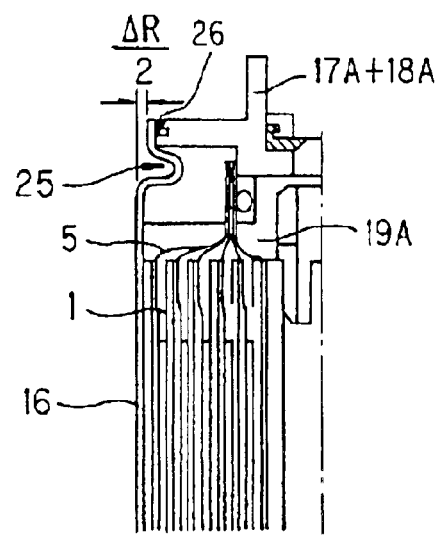

Next, the third invention will be described. The third invention is a lithium secondary battery comprising an electrode body having a positive electrode, a negative electrode, and a separator, with the positive electrode and the negative electrode being wound or laminated via the separator. The electrode body is impregnated with a nonaqueous electrolyte solution, and contained in a cylindrical battery case comprising at both the end portions thereof electrode caps having a battery cap, an internal terminal and an external terminal. The battery is sealed with a caulked portion formed by a portion brought into contact with the electrode cap of the battery case and press-contacted, and being structured so that $R_{body}$ and $R_{top}$ fulfill the relationship of $R_{body>Rtop}$, with $R_{body}$(mm) being a diameter of the body part of the battery ease and $R_{top}$(mm) being a diameter of the caulked portion. The tip portion of the battery case and the outer periphery portion of the electrode cap are joined by welding processing. As shown in FIG. 4(a) and FIG. 4(b), within a range of intensity of a battery case 16, a positive electrode cap, a negative electrode cap, the diameter $R_{body}$ of the body part of the battery case and the diameter $R_{top}$ of the caulked portion arc caulked intensively to fulfill the relationship of $R_{body}>R_{top}$ so that the caulked gap between the battery case 16 and the electrode cap is removed, and thereby welding will become possible to be executed stably and leakage of electrolyte solution can be controlled.

At this time, the battery case is preferably made of Al or Al alloy, and as for the shape of the battery case, it is preferably shaped as a pipe. A technological significance of adopting Al or Al alloy for the battery case is like the first invention.

In addition, the battery cap as well as the external terminal is preferably made of Al or Al alloy. The electrode cap of the third invention plays three roles of covering the battery by being welded with the battery case (the battery cap), extracting currents externally by being connected with the internal terminal (the external terminals), and receiving currents inside the electrode body by being joined with electrode leads (the internal terminals). In the present invention, due to the above-described reasons, at the time when a case made of Al material is used as the battery case, a cap made of the same Al material are used as the battery cap is easily welded with the battery case so that such firm welding that has good weld penetration and uniform quality as if the battery case and the electrode cap were integrated. In addition, Al provides good electric conductivity and is conventionally used for external terminals widely. When respective members of the battery caps, external terminals and internal terminals are brought into joining, its method is not limited in particular but can be joined by means of friction joining, brazing, welding, caulking, forging caulking, etc.

At that time, for the positive electrode side, Al may be used for all the electrode lead, the battery cap, the external terminal and the internal terminal. However, on the negative electrode side, due to negative electrode electrochemical reaction, Al cannot be used for the electrode lead, and Cu or Ni is used. Accordingly, in order to make electricity collection resistance from electrode leads small, in the case that the electrode leads are made of Cu, the negative internal terminal is preferably made of Cu, and in the case that the electrode leads are made of Ni, the negative internal terminal is preferably made of Ni or Cu. The negative internal terminal of thus-determined material and the negative external terminal of Al material may be joined in the above-described method.

Here, Cu and Ni used for negative internal terminals are preferably Cu or Cu alloy, and Ni or Ni alloy. In addition, Cu and Ni refers to pure copper and pure nickel, and those with purity of 90% or more can be used without any problem.

In the third invention, with $\Delta R$(mm) being a difference between $R_{body}$(mm) and $R_{top}$(mm), $\Delta R$ preferably fulfills the relationship of $\Delta R \leq 5$(mm), and the $R_{body}$ and the $\Delta R$ preferably fulfill the relationship of $(\Delta R/R_{body}) \times 100 \leq 10$ (%). This comes from the later-described outcome of examples that caulking with force not less than this gives rise to cracks in battery cases.

Moreover, in the third invention, joining between the entire area of the tip portion of the battery case and the electrode caps is preferably executed with welding in order to be firmly sealed. In addition, a squeezed portion is preferably formed in the very vicinity of the outer periphery portion of the electrode cap. As in the present invention, the tip portion of the battery case and the outer periphery portion of the electrode cap are caulked, a portion in the very vicinity of the outer periphery portion of the electrode cap undergoes squeezing processing and the entire area of the tip portion of the battery case and the electrode cap undergoes welding so that, in the case that it is mounted on a vehicle, the stress such as vibration, etc., applied to a lithium secondary battery can be dispersed. Accordingly, stability of welding at the caulked portion is improved, and also in case of use as a battery for a vehicle, long period sealing can be maintained against vibration applied thereto at all time during movement.

Figure 5:
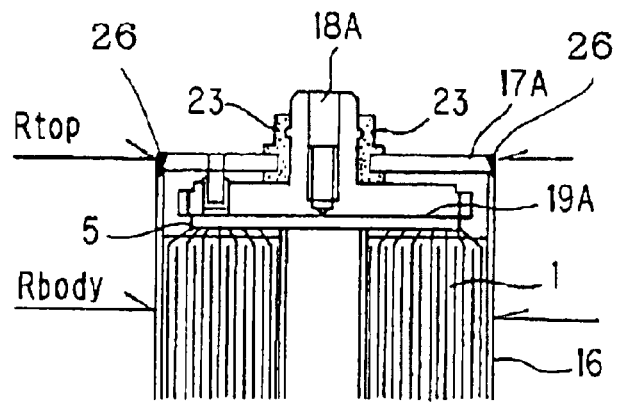
FIG. 5 is a sectional view showing an embodiment of a conventional lithium secondary battery.

Incidentally, in conventional batteries, as shown in FIG. 5, which do not undergo squeezing and caulking, all stress is concentrated into the welding part 26, and such batteries do not withstand vibrations, leaving problems.

Incidentally, a fixing method by means of welding on electrode caps, etc., is not limited to the embodiment shown in FIG. 4. FIGS. 6(a) and 6(b), FIGS. 7(a), 7(b) and 7(c) are sectional views showing a lithium secondary battery involving another welding method.

Figure 6A:
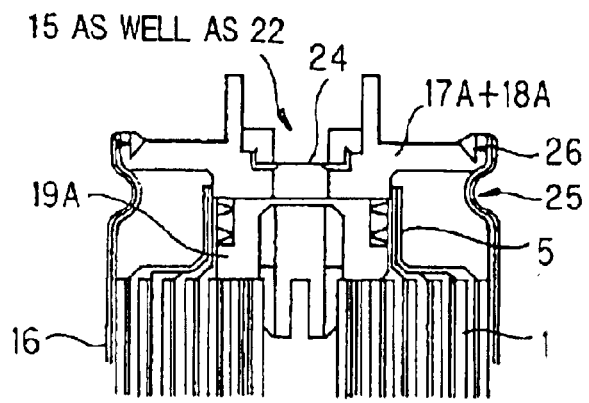
FIGS. 6(a) and 6(b) are sectional views showing an embodiment of welding between a battery case and an electrode cap in the lithium secondary battery of the present invention.
Figure 6B:
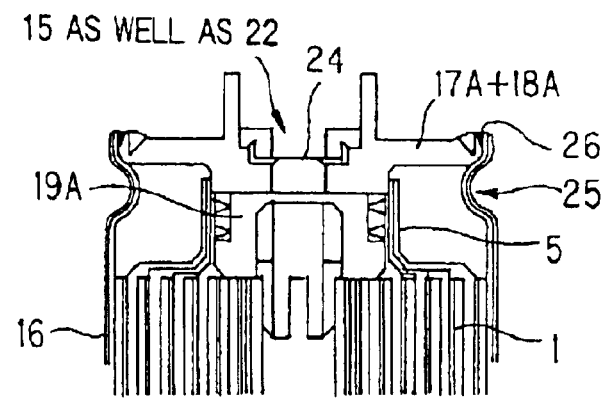

FIG. 6(a) shows a welding method by passing a laser through the side face of the battery case 16 to reach the electrode cap, while FIG. 6(b) shows a welding method by irradiating laser from an end surface side of the battery case 16. In this occasion, compared with the embodiment shown in FIG. 6(b), the embodiment shown in FIG. 6(a) is not greatly influenced by eccentricity of the welded portion 26, but if there is a gap between the battery case 16 and the electrode cap, welding becomes insufficient. In addition, compared with the embodiment shown in FIG. 6(a), the embodiment shown in FIG. 6(b) is unlikely to be influenced by the above-described gap since the laser is irradiated to the abutment directly, but is apt to be influenced by eccentricity of the welded portion 26, and therefore the laser must be irradiated accurately onto the face to be welded.

As shown in the later-described examples, the welding methods in FIG. 6(a) and FIG. 6(b) are practically usable as a lithium secondary battery for a vehicle sufficiently in the case where the caulking range of the present invention is used.

Figure 7A:
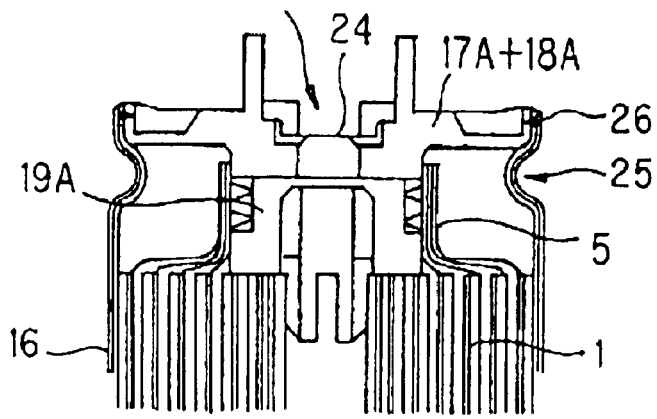
FIGS. 7(a), 7(b) and 7(c) are sectional views showing another embodiment of welding between a battery case and an electrode cap in a lithium secondary battery of the present invention.

FIG. 7(a) is a welding method by passing a laser through the side face of the battery case 16 to reach the electrode cap as in FIG. 6(a) for a battery in which the electrode cap enters a fixed state by caulking and further the battery case 16 was fallen out so that the tightly contacting performance of welding has been improved. As shown in FIG. 7(a), falling the battery case 16 inward, that will result in reducing stress to be applied to the welded portion 26, can be said to be a welding method that can improve vibration resistant performance.

Figure 7B:
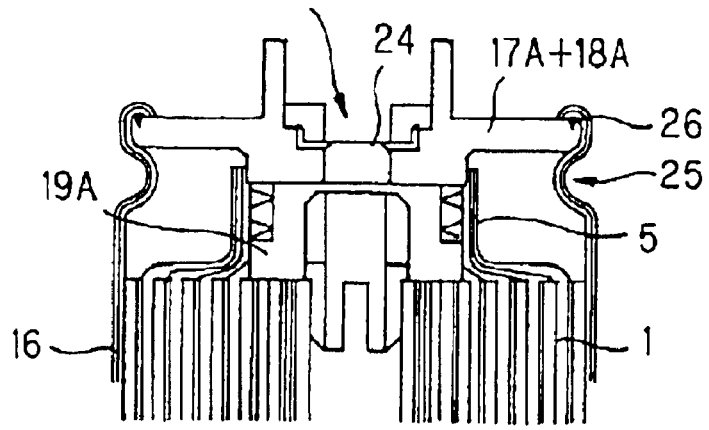
Figure 7C:
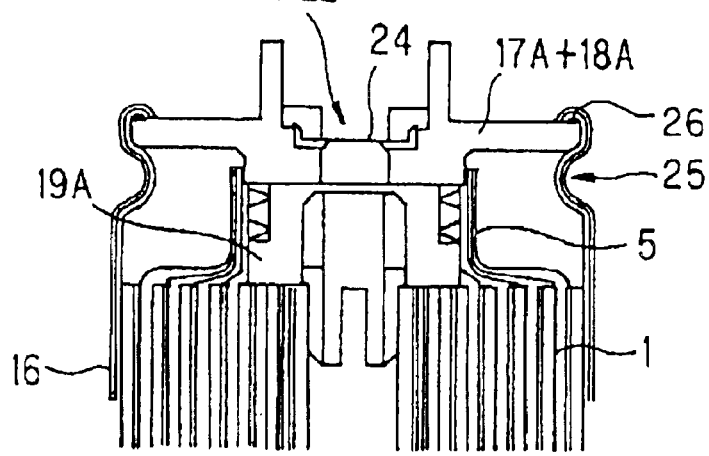

FIG. 7(b) and FIG. 7(c) are different from FIG. 6(a), FIG. 6(b) and FIG. 7(a) in terms of shape of electrode caps. The outer periphery portion of the electrode caps in FIG. 6(a), FIG. 6(b) and FIG. 7(a) are shaped as thin plates which are shaped so as to accept caulking stress of the battery case 16 as a bending stress without any deformation. To the contrary, the electrode caps in FIG. 7(b) and FIG. 7(c) have a uniform thickness over the entire battery caps, and are shaped as a sheet of straight plate.

That embodiment in FIG. 7(b) is a welding method in which the entire battery caps have a uniform thickness and the battery case 16 is brought down so as to cover the upper portion of the electrode cap shaped as a sheet of straight plate, and thereby for batteries with tight contacting performance between the battery case 16 and the electrode cap, the laser is irradiated from the end surface side of the battery case 16 as in FIG. 6(b).

In addition, FIG. 7(c) shows a welding method to irradiate a laser from the end surface side of the battery case 16 as in FIG. 6(b) for a battery with an electrode cap shaped the same as that in FIG. 7(b) having a battery case 16 to be caulked to fall out similarly as FIG. 7(b). These FIG. 7(b) and FIG. 7(c) can be said to show welding methods being excellent in vibration-resistant performance due to tight contacting performance between the battery case 16 and the electrode cap.

Here, for application of the produced lithium secondary batteries of the first to third inventions, motor driving ones for EVs and HEVs, etc., for example, are considered. In this case, for motor driving, voltages of 100 to 200 V is necessary, and therefore, it is necessary to connect a plurality of batteries in series. Under the circumstances, it is preferable that the positive external terminal 18A and the negative external terminal 18B are disposed in the center of the end surface of the battery 14 as in the electrode terminal structure of the battery 14 shown in FIG. 1(a) and FIG. 4(a), because connection between batteries becomes easy.

Figure 10A:
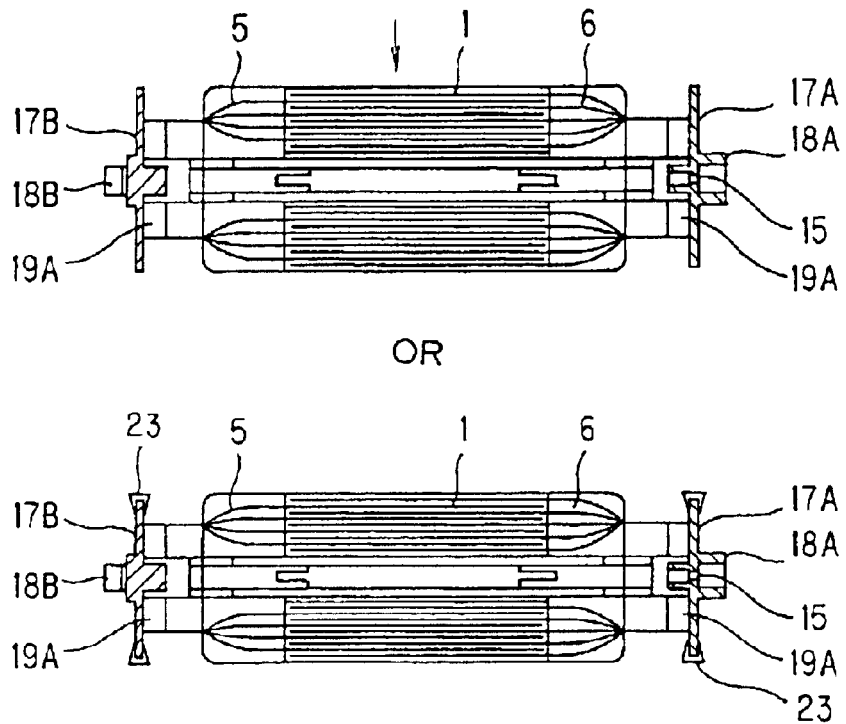
FIGS. 10(a) and 10(b) are continuous sectional views showing manufacturing steps of the lithium secondary battery of the present invention following FIGS. 9(a) to 9(d).
Figure 10B:
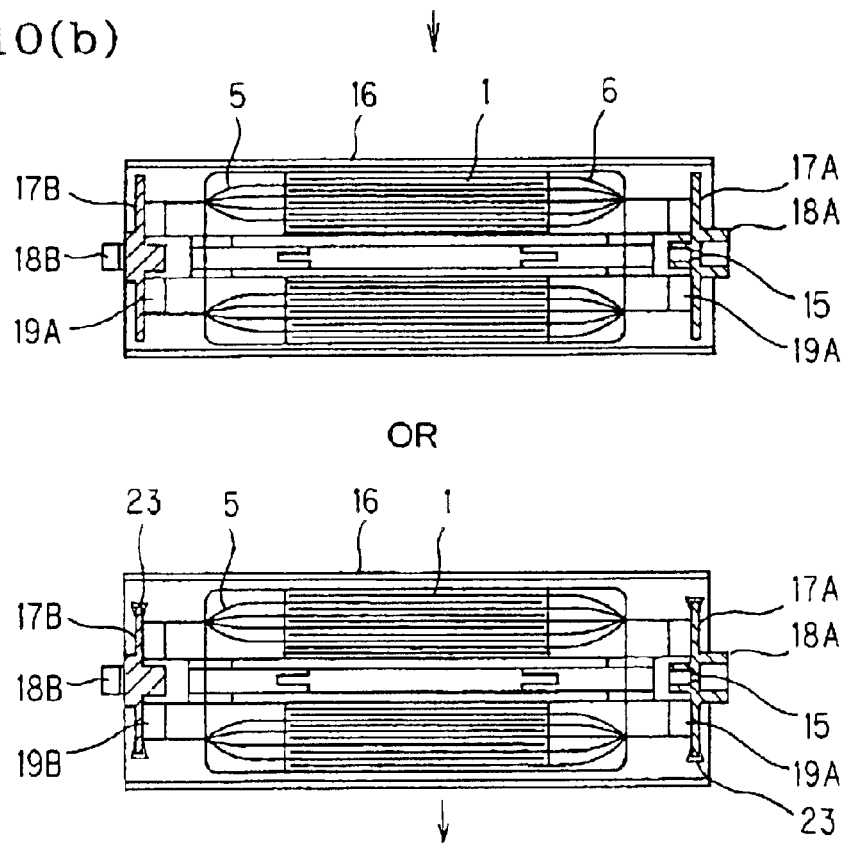
Figure 11A:
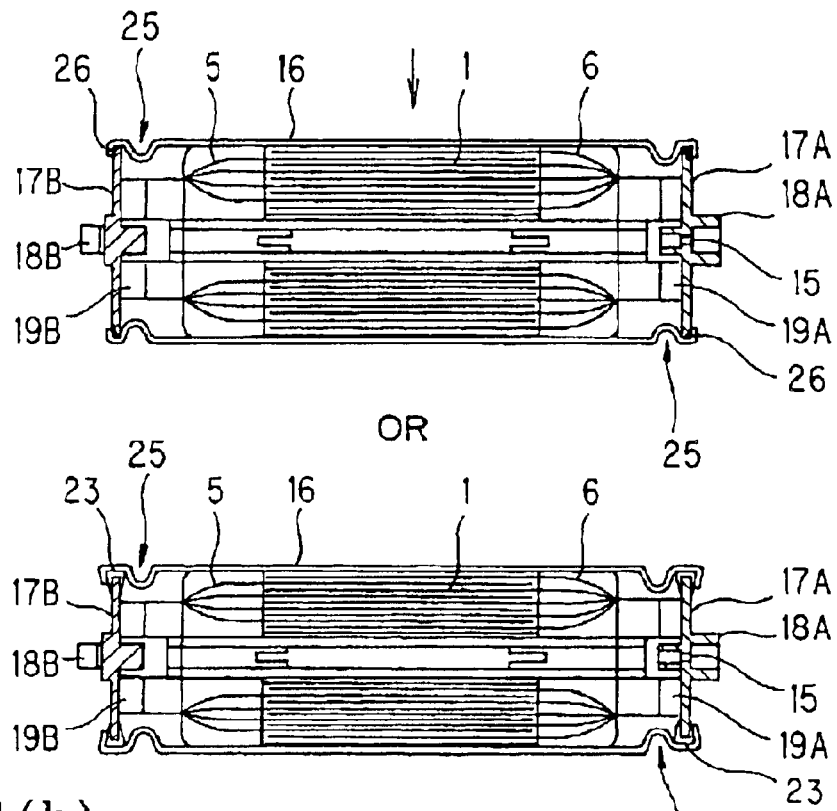
FIGS. 11(a) and 11(b) are continuous sectional views showing manufacturing steps of the lithium secondary battery of the present invention following FIGS. 10(a) and 10(b).
Figure 11B:
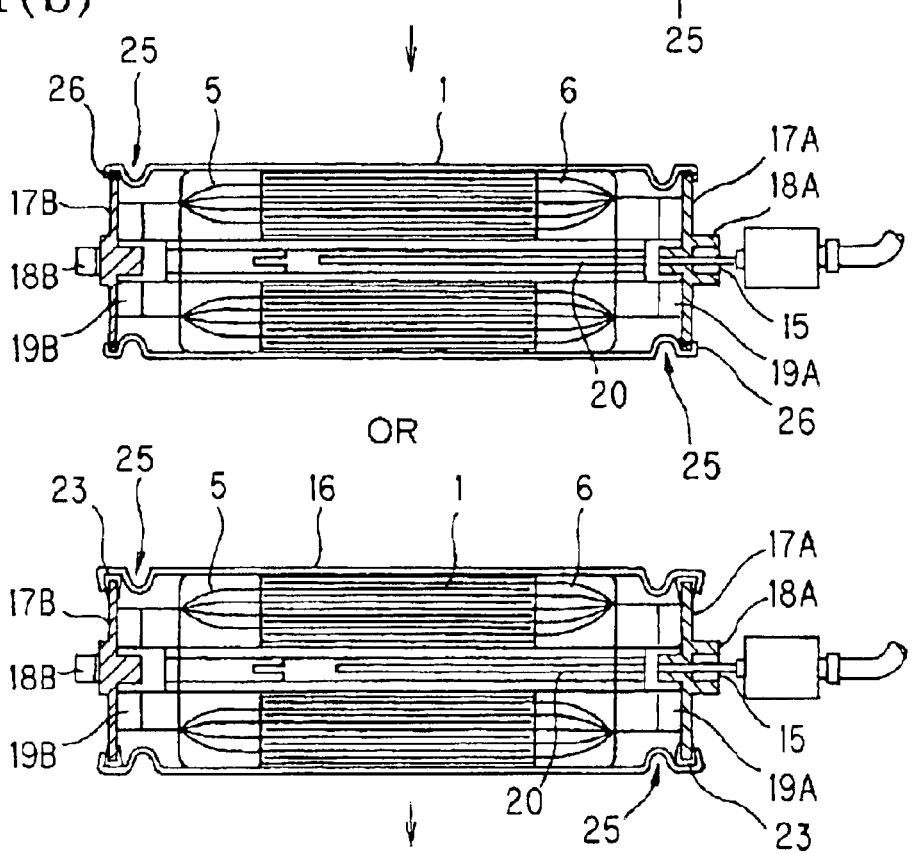
Figure 12:
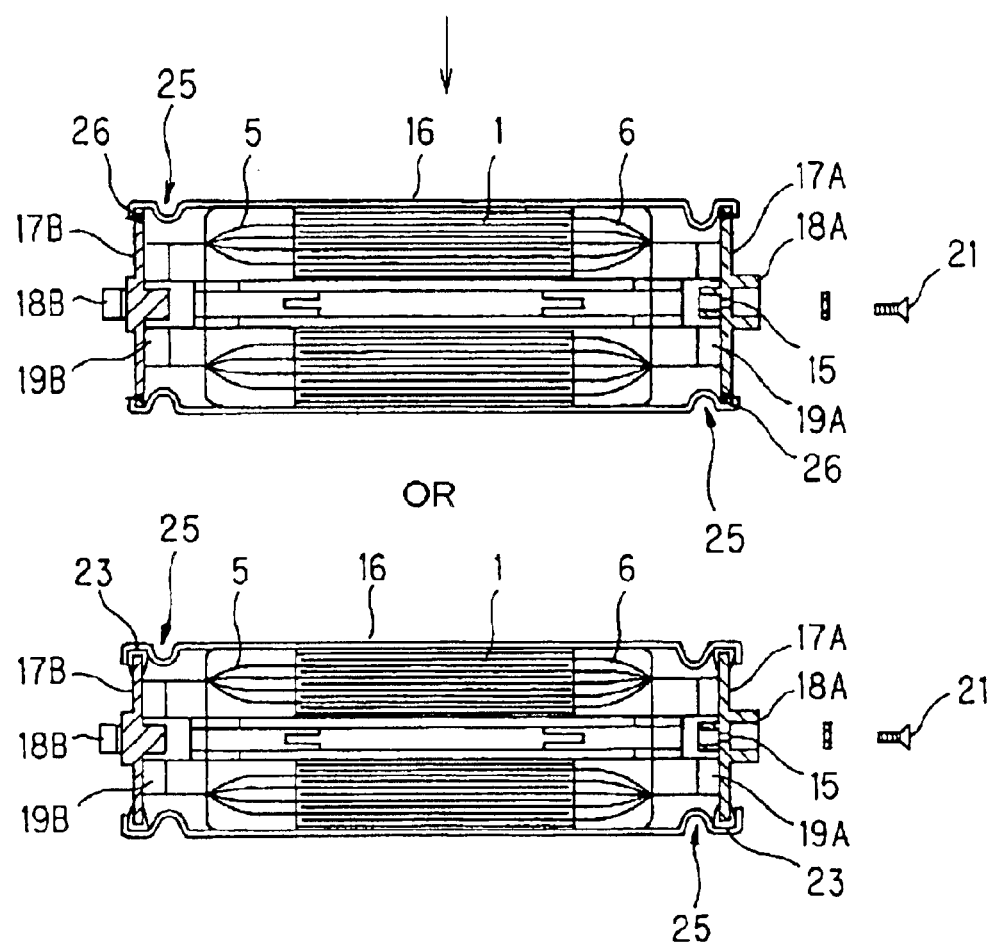
FIG. 12 is continuous sectional views showing manufacturing steps of the lithium secondary battery of the present invention following FIGS. 11(a) and 11(b).

Next, a fourth invention will be described. With respect to a manufacturing method of a lithium secondary battery of the fourth invention, at first a battery element is formed by joining respective electricity collection tabs provided in both the ends of the internal electrode body which is structured by coiling the positive electrode and the negative electrode via a separator around the outer periphery of the winding core and respective internal terminal portions of the two electrode caps together. Next, this battery element is inserted into a battery case with both the ends being left open, and thereafter respective both end portions of the battery case and respective outer periphery portions of two electrode caps are joined together. In addition, lastly, electrolyte solution is injected from an electrolyte solution injection port provided in at least one electrode cap, and thereafter the electrolyte solution injection port is sealed. Thus, as depicted in FIG. 9(a), FIG. 9(b), FIG. 9(c), FIG. 9(d) and FIG. 10(a), a battery element is produced by joining an internal electrode body 1 and two electrode caps of a positive electrode cap and a negative electrode cap in advance, and as depicted in FIG. 10(b), they are integrated and are inserted into a battery case 16, and thereby operations executed inside a battery case 16 can be made unnecessary, and in addition, selected good battery elements only can be used in the subsequent step, and therefore steps can be simplified and improvement in productivity can be planned. Moreover, as depicted in FIG. 11(a), FIG. 11(b) and FIG. 12, after joining the battery case 16 with the outer periphery portion of the electrode cap by squeezing processing and caulking to seal the battery, an electrolyte solution is injected so that the electrolyte solution is confined to a body part of the battery case for certain, and therefore suppression of electrolyte solution leakage of the battery can be planned.

Moreover, in the fourth invention, it is preferable that respective both end portions of the battery case and respective outer periphery portions of the two electrode caps are joined, and at the same time or therebefore/thereafter, the electrode cap of the battery case is squeezed in the very vicinity portion of the outer periphery portion. Thereby, the electrode caps in the battery is positioned and fixed.

In the fourth invention, caulking and/or welding method is preferably used as a method for joining the battery case and the electrode cap. A technological significance of adopting these methods and suitable methods will be described hereinbelow.

In the fourth invention, in the case that caulking method is adopted as a method for joining the battery case and the electrode caps, it is preferable to arrange an elastic body between the battery case and the electrode cap. As shown in the lower drawing in FIG. 11(a), in the case that a packing 23 which is an elastic body corresponding with a shape of electrode cap is used, this packing 23 shows appropriate elastic deformation by caulking, and on caulking, the deformation quantity in the loading direction of this packing preferably is larger than spring-back quantity and is preferably not more than the stress with the elasticity maintaining rate of the elastic body being not less than 95%.

The integrated battery element is inserted into the battery case, with a battery case being caulked to reach a certain point with the autograph, which position is treated as a reference, with displacement being monitored so that the load is gradually made small, and the spring-back quantity refers to the displacement quantity from the reference position when the load has been completely released. Accordingly, if the deformation quantity in the loading direction of the elastic body is larger than the spring-back quantity, no gap is formed even after caulking is finalized, and thereby, leakage of electrolyte solution is prevented.

In addition, the elasticity maintaining rate of the elastic body is expressed by changes in thickness before and after application of stress when compression stress is applied to an elastic body of, for example, the outside diameter of 10 mm$\phi$×the inside diameter 7 mm$\phi$×1 mm with an autograph, and the compression stress is released after a predetermined time has lapsed. That is, with $A_1$ being thickness of the elastic body before application of the stress and with $B_1$ being thickness of the elastic body after application of the stress, the elasticity maintaining rate D is given by $D=B_1/A_1 \times 100$.

FIGS. 3(a) to 3(d) are explanatory graphs showing the elasticity maintaining rate and the displacement quantity in terms of its relationship with the applied stress with respect to respective elastic bodies processed to have sizes of the outside diameter 10 mm$\phi$×the inside diameter 7 mm$\phi$×1 mm ((a) ethylene propylene rubber, (b) fluoride resin, (c) polyethylene and (d) polypropylene), and shaded framed portions shown in the respective drawings are the suitable ranges of the present invention. That is, if the elasticity maintaining rate is 95% or more, elasticity is secured as well as the plane pressure is secured.

In addition, in the fourth invention, in the case that welding method is used as a method for joining the battery case and the electrode cap, the YAG laser is preferably used as the energy sources at the time of welding operation. At this time, the tip portion of the battery case and the entire area of the outer periphery portion of the electrode cap are preferably welded to execute sealing for certain.

Since this welding is executed before injection of the electrolyte solution, it is not necessary to take deterioration of the electrolyte solution into consideration, and a suitable range of conditions of that welding is wider compared with the case that the electrolyte solution is previously injected, but since a resin component (separator) is used for the internal electrode body, the temperature at the time of welding is limited.

In order to control battery temperature increase at the time of welding, the welding method with high input energy density is good, and in particular the welding method in which the above-described temperature reaches not more than 100° C. is preferable. As that kind of welding method, there are laser welding and electron beam welding in which the welding beam (arc) is concentrated. Laser welding can proceed with welding in the atmosphere, and an apparatus is simple and of good productivity. To the contrary, it is necessary to proceed with electron beam welding under a vacuum state, and much costs are incurred depending on an apparatus, and the manufacturing steps increases in number.

Among laser welding methods, YAG laser welding used in the present invention provides high energy density of its beam, can execute welding on aluminum in a short time, and can limit temperature increase to the least level, and thus is capable of realizing highly reliable welding.

In the fourth invention, as a battery case, it is preferable to use the one made of aluminum or aluminum alloy. The battery case made of such material, which is put on the market with various kinds of diameters, therefore is easily available and inexpensive, and moreover, since aluminum and aluminum alloy is light, weight reduction of a battery becomes realizable and improvement in weight energy density and weight output density of a battery can be planned. Moreover, also in molding of a battery, it has a feature of easy caulking and squeezing. Aluminum here refers to pure aluminum, but the one with purity of 90% or more can be used without any problems.

At the time when a case made of Al material is used as the battery case, if a cap made of the same Al material is used as the battery cap to be welded with the battery case, such firm welding that has good welding penetration and uniform quality as if the battery case and the electrode cap were integrated can executed. Aluminum provides good electric conductivity and is conventionally used for external electrodes widely.

For a lithium secondary battery, on the positive electrode side, aluminum may be used for all the electricity collection tabs, the positive electrode cap, the external terminal and the internal terminal, but on the negative electrode side, due to negative electrode electrochemical reaction, aluminum cannot be used for the electricity collection tabs, and therefore the negative electricity collection tabs are made of copper or nickel. In this case, in order to make electricity collection resistance from electricity collection tabs small, in the case that the electricity collection tabs are made of copper, the negative internal terminal is preferably made of copper, and in the case that the electricity collection tabs are made of nickel, the negative internal terminal is preferably made of nickel or copper. Moreover, in the case that aluminum is used for the negative external terminals in consideration of welding with a battery case, the above-described negative internal terminals and aluminum may be joined by means of friction joining, brazing, welding, caulking, forging caulking, etc.

Here, copper and nickel used as negative electricity collection tab and negative internal terminals are preferably copper or copper alloy, and nickel or nickel alloy. In addition, copper and nickel refer to pure copper and pure nickel, and those with purity of 90% or more can be used without any problem.

In addition, an electrolyte solution injection method in the present invention is not limited in particular, but for a lithium secondary battery of the present invention structured as described above, a method as follows will be suitable. When the electrolyte solution is filled, as shown in FIG. 11(b), a battery is vacuumed with a vacuum pump to be filled with a vacuum atmosphere, and utilizing difference pressure with the atmosphere, the electrolyte solution is injected from the electrolyte solution injection port 15. Here, it is preferable that a vacuum level reaches a high vacuum state than around 0.1 torr (13.3 Pa).

Incidentally, during the impregnation processing of electrolyte solution, the electrolyte solution is preferably held at such a vacuum level that the electrolyte solution will not boil, and the vacuum level at this time largely depends on physical properties of solvent structuring the electrolyte solution to be used. In addition, as a material of the nozzle 20, metal or resin that is not eroded by electrolyte solution is used, and the nozzle 20 is connected with the electrolyte solution storage tank via tubes, pipes or the like so that the electrolyte solution is transferred from the electrolyte solution storage tank with a quantitative pump, etc.

Thus, the battery is filled up with an electrolyte solution from the bottom so as to impregnate the internal electrode body 1 from the bottom to the top, and bubbles to be generated from the internal electrode body 1 become releasable in the space which is not impregnated with the electrolyte solution, and thus, impregnation of the electrolyte solution will become executable efficiently. Thus, it becomes possible to shorten the injection time of the electrolyte solution, and in this case, even in the case that highly volatile solvent is contained in the electrolyte solution, the evaporation quantity thereof is suppressed to the minimum extent, and deterioration in the features of electrolyte solution is avoided.

Next, after the impregnation processing of the electrolyte solution is finalized, circumference of the electrolyte solution injection port is purged with an inert gas such as nitrogen or argon, and thereafter the surplus electrolyte solution remaining inside the battery is emitted outward with the nozzle 20. At this time, in order that the more surplus electrolyte solution filled into the disposition space of the positive internal terminal is emitted, the tip of the nozzle 20 is preferably inserted to reach the bottom of the battery.

Lastly, the electrolyte solution injection port 15 is blocked by a simple and easy sealing method such as a screw 21 or filling of sealing material from outside. If this blocking operation can be executed by a simple and easy method, reduction in facility costs and reduction in quantity of purge gas for use can be planned.

The lithium secondary battery of the present invention is the one using an electrode body comprising the positive electrode and the negative electrode, both being wound or laminated via a separator, an electrolyte solution, and a cylindrical battery case comprising electrode caps at both end portions. Accordingly, other materials and battery structure are not limited at all. Main members constructing the battery and structures thereof will be described hereinbelow.

One of structures of the electrode body, which is, referable to the heart of a lithium secondary battery, is single cell structure comprising respective positive and negative active materials undergoing press molding into a disk form with a separator being sandwiched between them as seen in a small capacity coin battery.

Figure 13:
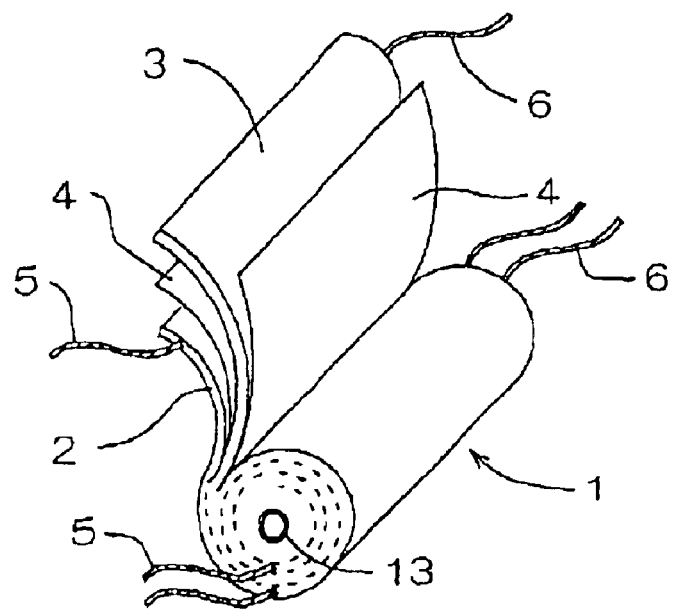
FIG. 13 is a perspective view showing a structure of a wound-type electrode body.

One of structures of electrode body to be used for a large capacity battery unlike a small capacity battery such as a coin cell is a wound type. As depicted in FIG. 13, a wound-type electrode body 1 is structured so that a positive electrode 2 and a negative electrode 3 being wound around the outer periphery of a winding core 13 via a separator 4 made of porous polymer so that the positive electrode 2 and negative electrode 3 are not brought into direct contact with each other. At least one each of electrode leads 5 and 6 which have been attached to the positive electrode 2 and the negative electrode 3 (hereinbelow referred to as "electrodes 2 and 3") will be satisfactory, and with plurality of electrode leads 5 and 6, electricity collection resistance can be made small.

Figure 14:
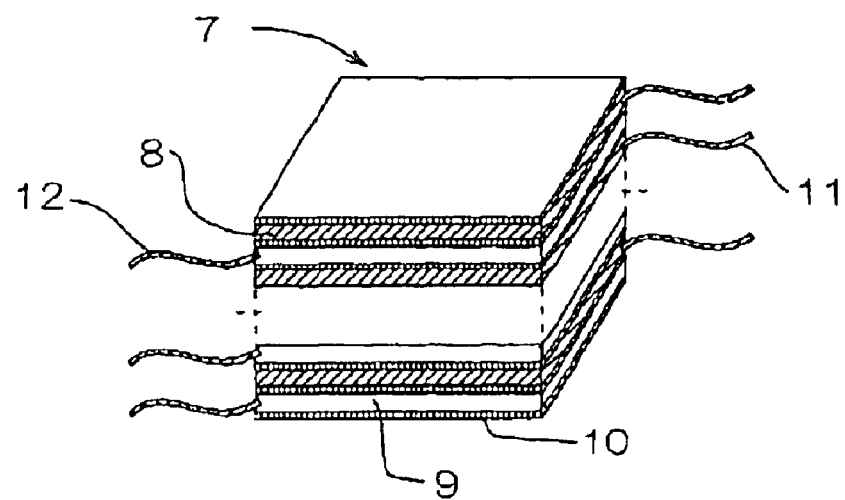
FIG. 14 is a perspective view showing a structure of a lamination-type electrode body.

As another structure of the electrode body, a lamination type structured by laminating a plurality of stages of single cell type electrode body used for a coin cell can be exemplified. As depicted in FIG. 14, the lamination-type electrode body 7 is the one structured so that a positive electrode 8 and a negative electrode 9 of predetermined shapes sandwich the separator 10 and are laminated alternately, and at least one each of electrode leads 11 and 12 are attached to the one each of electrodes 8 and 9. Materials for the electrodes 8 and 9, producing methods of the electrodes 8 and 9, and the like are the same as those on the electrodes 2 and 3 or the like on the wound-type electrode body 1.

Next, with the wound-type electrode body 1 as an example, construction thereof will be described in detail. The positive electrode 2 is produced with positive active material being coated on both surfaces of the electricity collection substrate. As an electricity collection substrate, metal foils such as aluminum foils and titan foils, which give good corrosion resistance against positive electrode electrochemical reaction, are used. In addition, as a positive active material, a lithium transition metal compound oxide such as lithium manganese oxide ($LiMn_2O_4$) or lithium cobalt oxide ($LiCoO_2$) is suitably used, and carbon micro powder such as acetylene black is preferably added to these as a conduction assistant agent.

Coating of the positive active material is executed in roll coater method or the like by applying onto the electricity collection substrate slurry or paste produced by adding solvent, binding agent or the like to the positive active material powder and drying them, and thereafter, according to necessity, press processing or the like is executed.

The negative electrode 3 can be produced like the positive electrode 2. As an electricity collection substrate of the negative electrode 3, metal foils such as copper foils or nickel foils, which give good corrosion resistance against negative electrode electrochemical reaction, are used. As a negative active material, an amorphous carbon material such as soft carbon or hard carbon, or carbon powder of highly graphitized carbon material such as artificial graphite or natural graphite is used.

As the separator 4, the one having a three-layer structure in which a polyethylene film (PE film) having $Li^+$ permeability and including micropores is sandwiched between porous polypropylene film (PP film) having $Li^+$ permeability is preferably used. This serves also as a safety mechanism in which, when the temperature of the electrode body is raised, the PE film is softened at about 130° C. so that the micropores are collapsed to control the movement of Li+, that is, the battery reaction. In addition, with this PE film being sandwiched between the PP films having a higher softening temperature, even when the PE film is softened, the PP films hold their shapes so that the positive electrode 2 and the negative electrode 3 are prevented from contact/short circuit and concrete control and safety of battery reaction become possible.

At the time of winding operation of these electrodes 2 and 3 and the separator 4, the electrode leads 5 and 6 are respectively attached to the portions where the electricity collection substrate onto which electrode active material is not coated is exposed from the electrodes 2 and 3. As the electrode leads 5 and 6, those shaped as foils made of the same material as the electricity collection substrate of the respective electrodes 2 and 3 are suitably used. The electrode leads 5 and 6 can be attached to the electrodes 2 and 3 by ultrasonic welding, and spotting welding or the like.

Next, nonaqueous electrolyte solution used for the lithium secondary battery of the present invention will be described. As a solvent, it is preferable to use a single solvent or a mixture solvent of those of the carbonic acid ester system such as ethylene carbonate (EC), diethyl carbonate (DEC), dimethyl carbonate (DMC) and propylene carbonate (PC), or γ-butyrolactone, tetrahydrofuran, acetonitrile, etc.

Lithium compounds to be dissolved into such solvents, that is, electrolyte, can be exemplified by lithium fluoride complex compounds such as lithium phosphate hexafluoride ($LIPF_6$) and lithium fluoborate ($LiBF_4$), or lithium halide such as lithium perchlorate ($LiClO_4$), and one or more kinds thereof are dissolved in the above-described solvent for use.

The present invention will be hereinbelow described further in detail based on Examples.

EXAMPLES 1 TO 4 AND COMPARATIVE EXAMPLES 1 AND 2

Batteries for Examples 1 to 4 and Comparative examples 1 and 2 were produced by welding an internal electrode body produced by winding the one with sizes of width 200 mm and length 3600 mm as a positive electrode substrate and the one with sizes of width 200 mm and length 4000 mm as a negative electrode substrate with electrode caps provided with packing at both the end portions thereof, and after putting it into a battery case of inside diameter 48 mmφ as an integrated battery element, squeezing or caulking the battery case, subsequently injecting electrolyte solution from the electrolyte solution injection port provided in the battery caps, and sealing the injection port. Incidentally, Al pipe was used as a battery case, ethylene propylene rubber of thickness 1 mm was used as a packing for production.

Results of assessment on soundness of caulking in the above-described Examples and Comparative examples will be shown in Table 1. Here, the caulked portions of Examples 1 to 4 and the Comparative examples 1 and 2 were produced by a caulking method that executed adjustment so as to give rise to differences in stress to be applied to the caulked portions. The outside diameters of the electrode caps and the battery shapes at this time are as indicated in Table 1. In addition, other members and test environments were made to be the same for all the test samples. Incidentally, taking practical matters into consideration, a solution containing $LiPF_6$ as electrolyte that was dissolved into equal capacity mixed solvent of EC and DEC so as to give density of 1 mol/l was used as nonaqueous electrolyte solution.

TABLE 1

| | OUTSIDE DIAMETER OF ELECTRODE CAP (mm) | $R_{body} - R_{top}$ (mm) | $\Delta R/R_{body}$ (%) | ASSESSMENT |
|---|---|---|---|---|
| COMPARATIVE EXAMPLE 1 | 45 | 0 | 0 | x: ELECTROLYTE SOLUTION LEAKAGE TOOK PLACE |
| EXAMPLE 1 | 45 | 0.5 | 1 | ; |
| EXAMPLE 2 | 45 | 2 | 4 | ; |
| EXAMPLE 3 | 43 | 4 | 8 | ; |
| EXAMPLE 4 | 42 | 5 | 10 | ; |
| COMPARATIVE EXAMPLE 2 | 41 | 6 | 12 | x: CRACKS APPEARED IN ALUMINUM PIPE |

As concerns assessment on the caulked portions, for Examples and Comparative examples, 100 batteries were produced respectively, and presence or absence of electrolyte solution leakage from the caulked portions, a chasm in the aluminum pipe caulked portions, and presence or absence of cracks was observed so that soundness of caulking was assessed. In Table 1, if any one of them fell into the state of the above-described insufficient performance, X was filled in, and if all the 100 units suffered from no liquid leakage or no cracks, ; was filled in.

(Assessment)

As apparent from Table 1, with $R_{body}-R_{top}=0$ mm, $\Delta R/R_{body}=0\%$, electrolyte solution leakage was observed and deformation of the packing revealed to be insufficient. In addition, in the case that the diameter of the caulked portion was up to $R_{body}-R_{top}=5$ mm, $\Delta R/R_{body}=10\%$ with respect to the diameter of the body part of the battery, no chasms, etc., appeared in the caulked portion, good caulking could be executed, and it was found out that sealing performance of the battery was held extremely well. In addition, in the case that the battery case underwent sealing processing to reach $R_{body}-R_{top}=6$ mm, $\Delta R/R_{body}=12\%$, the pipe was broken at the time of caulking, resulting in occurrence of cracks, and was found out to be unable to function as a battery. This is considered to take place due to the reason that the battery case was deformed too much and became no longer tolerable on loads.

EXAMPLES 5 TO 8 AND COMPARATIVE EXAMPLES 3 TO 5

Batteries for Examples 5 to 8 and Comparative examples 3 to 5 were produced to have an internal electrode body by winding the one with sizes of width 200 mm and length 3600 mm as a positive electrode substrate and the one with sizes of width 200 mm and length 4000 mm as a negative electrode substrate. The positive electrode cap provided with pressure release hole comprising the positive electrode battery cap, the positive external terminal, and positive internal terminal, and the negative electrode cap comprising the negative electrode battery cap provided with packing therebetween respectively, the negative external terminal, and negative internal terminal, both caps being welded with the internal electrode body, which was contained into the battery case of inside diameter 48 mmϕ as an integrated battery element, and thereafter the battery case underwent squeezing processing and caulking. Subsequently, the battery case and the electrode cap underwent welding with YAG laser in the entire circumference thereof so that YAG laser might pass through the side face of the battery case to reach the electrode cap as the welding method in FIG. 6A.

Figure 8:
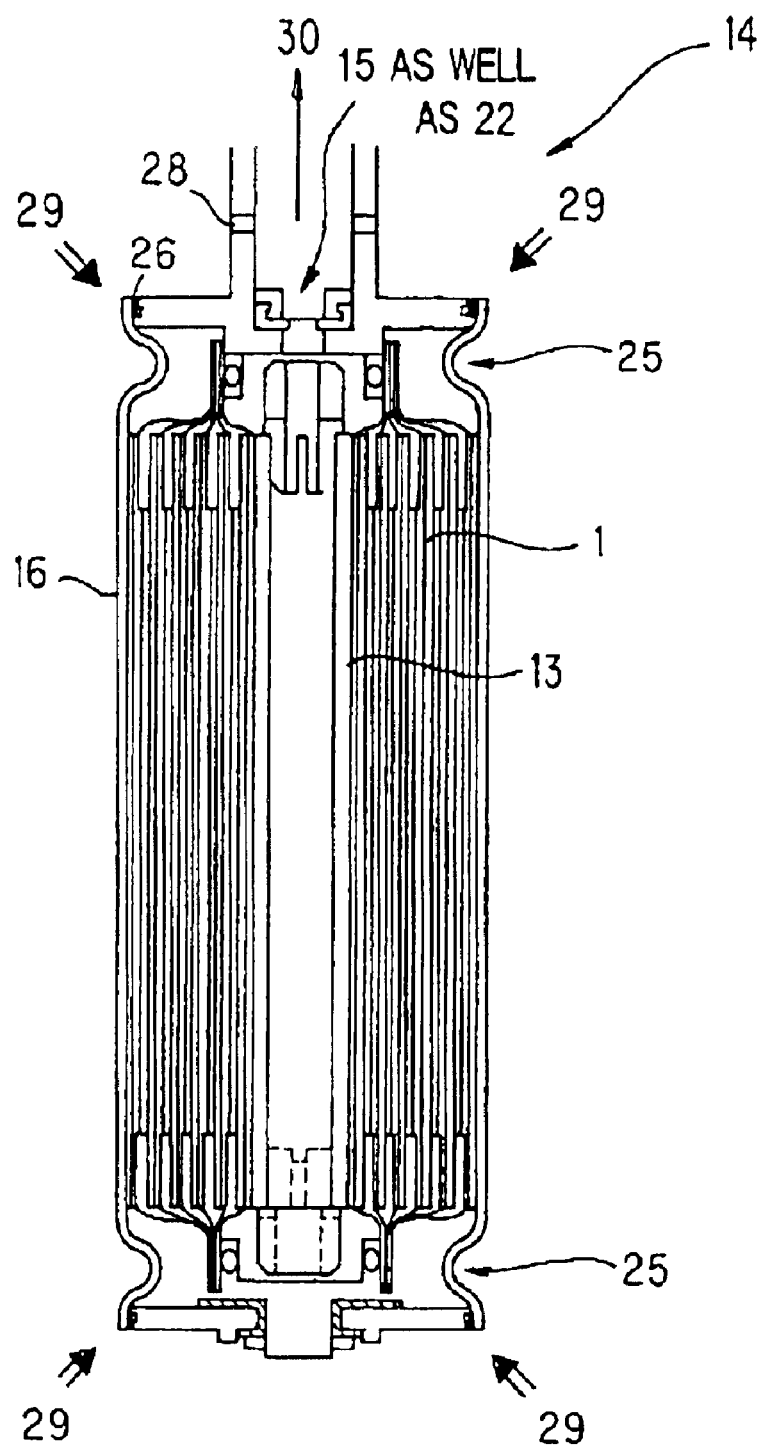
FIG. 8 is an explanatory view showing a method for He leakage tests of the welded portion between the battery case and the electrode cap in the lithium secondary battery of the present invention.
Figure 9A:
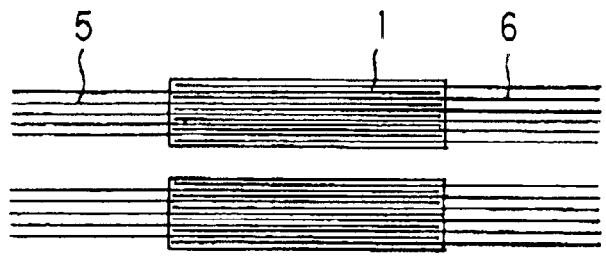
FIGS. 9(a) to 9(d) are continuous sectional views showing manufacturing steps of a lithium secondary battery of the present invention.
Figure 9B:
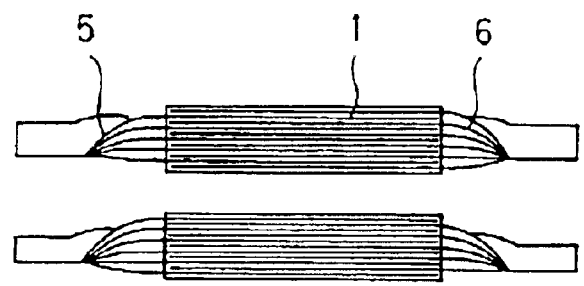
Figure 9C:
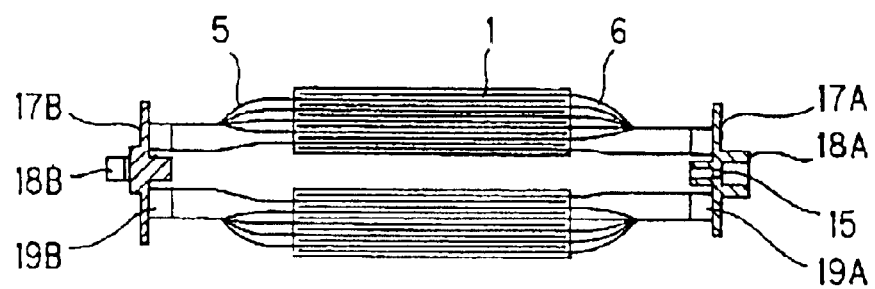
Figure 9D:
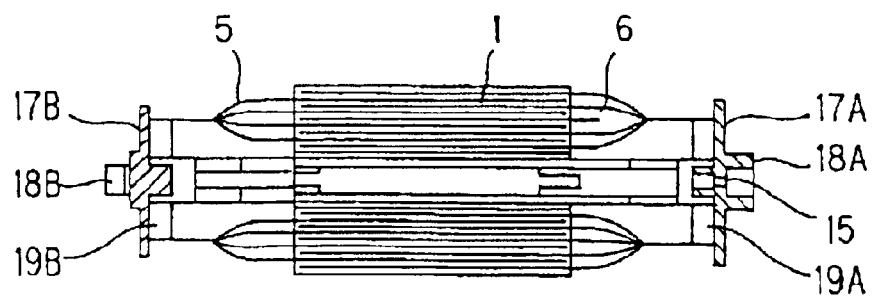

In addition, in the battery prior to electrolyte solution injection up to here, He leakage test was executed. That was executed with helium leak detector 30 by degassing inside the battery 14 into vacuum from the pressure release hole 22 given in the center of the electrode cap, and thereafter applying He gas 29 from the welded portion 26 where the battery case 16 and the electrode cap were welded, so as to detect whether or not the He gas 29 invaded the battery 14 as shown in FIG. 8. At this time, those with He partial pressure inside the battery 14 being not more than $10^{-9}\cdot Pa\cdot m^3/s$ was indicated with ○.

Subsequently, after completion of the He leakage test, the pressure release hole 22 was utilized as an electrolyte solution injection port 15 to inject the electrolyte solution and was sealed with a metal foil 24 and thus a battery was produced and was assessed. Incidentally, a battery case 16 was produced by using Al pipe, while a packing 23 was produced by using ethylene propylene rubber of thickness 1 mm.

EXAMPLES 9 TO 12 AND COMPARATIVE EXAMPLES 6 TO 8

As the batteries of Examples 9 to 12 and Comparative examples 6 to 8, lithium secondary batteries as in Examples 5 to 8 were produced with the method as in Examples 5 to 8 and assessed with the exception that welding between the battery cases was directly abutted against the electrode caps was executed in the portion where the battery cases and the electrode caps.

Results of assessment on He leakage and electrolyte solution leakage in the above-described Examples and Comparative examples are shown in Table 2 and Table 3. Here, the caulked portions in Examples 5 to 12 and Comparative examples 3 to 8 were produced by a caulking method in which adjustment was executed so as to give rise to differences in stress to be applied to the caulked portions by the above-described method. The outside diameters of the electrode caps and the battery shapes at this time are as indicated in Table 2 and Table 3. In addition, other members and test environments were made to be the same for all the test samples. Incidentally, taking practical matters into consideration, a solution containing $LiPF_6$ as electrolyte that was dissolved into equal capacity mixed solvent of EC and DEC so as to give density of 1 mol/l was used as nonaqueous electrolyte solution.

TABLE 2

| | OUTSIDE DIAMETER OF ELECTRODE CAP (mm) | $R_{body} - R_{top}$ (mm) | $\Delta R/R_{body}$ (%) | He LEAKAGE | ELECTROLYTE SOLUTION LEAKAGE |
|---|---|---|---|---|---|
| COMPARATIVE EXAMPLE 3 | 46 | 0 | 0 | x*1 | x |
| COMPARATIVE EXAMPLE 4 | 47 | 0 | 0 | x*1 | ; |
| EXAMPLE 5 | 47 | 0.5 | 1 | ; | ; |
| EXAMPLE 6 | 46 | 1.5 | 3 | ; | ; |
| EXAMPLE 7 | 45 | 2.5 | 5 | ; | ; |
| EXAMPLE 8 | 43 | 4.5 | 9 | ; | ; |
| COMPARATIVE EXAMPLE 5 | 42 | 5.5 | 11 | x*2 | —*3 |

*1 INSUFFICIENT WELDING
*2 CRACKS APPEARED IN THE A1 PIPE
*3 DUE TO THE OCCURRENCE OF CRACKS IN THE A1 PIPE, THE ELECTROLYTE SOLUTION LEAKAGE TEST WAS CANCELLED (LEAKAGE WILL TAKE PLACE FOR CERTAIN).

TABLE 3

| | OUTSIDE DIAMETER OF ELECTRODE CAP (mm) | $R_{body} - R_{top}$ (mm) | $\Delta R/R_{body}$ (%) | He LEAKAGE | ELECTROLYTE SOLUTION LEAKAGE |
|---|---|---|---|---|---|
| COMPARATIVE EXAMPLE 6 | 46 | 0 | 0 | x*1 | x |
| COMPARATIVE EXAMPLE 7 | 47 | 0 | 0 | x*1 | x |
| EXAMPLE 9 | 47 | 0.5 | 1 | ; | ; |
| EXAMPLE 10 | 46 | 1.5 | 3 | ; | ; |
| EXAMPLE 11 | 45 | 2.5 | 5 | ; | ; |
| EXAMPLE 12 | 43 | 4.5 | 9 | ; | ; |
| COMPARATIVE EXAMPLE 8 | 42 | 5.5 | 11 | x*2 | —*3 |

*1 INSUFFICIENT WELDING
*2 CRACKS APPEARED IN THE A1 PIPE
*3 DUE TO OCCURRENCE OF CRACKS IN THE A1 PIPE, THE ELECTROLYTE SOLUTION LEAKAGE TEST WAS CANCELLED (LEAKAGE WILL TAKE PLACE FOR CERTAIN).

As concerns assessment on He leakage and electrolyte solution leakage, for Examples and Comparative examples, 100 batteries were produced respectively, and presence or absence of electrolyte solution leakage and He leakage from the caulked portions where the battery case and the electrode cap were welded, a chasm in the aluminum pipe caulked portions, and presence or absence of cracks were observed to execute assessment. In Table 2 and Table 3, if any one of them fell into the slate of the above-described insufficient performance, (X) was filled in, and if all the 100 units suffered from no He leakage, no liquid leakage or no cracks, (:) was filled in.

(Assessment 2)

As apparent from Table 2, in the lithium secondary battery where a battery case and electrode caps were welded as in FIG. 6(a), in Comparative example 3 and Comparative example 4 with $R_{body}-R_{top}=0$ mm, $\Delta R/R_{body}=0\%$, He leakage was observed, and in Comparative example 3, liquid leakage also took place as a consequence. It was found out that this is because welding was not sufficient due to a gap present between the electrode cap and the battery case, due to insufficient caulking from sectional observation on the welded portion.

In Comparative example 4, liquid leakage did not take place but He leaked, and therefore sealing performance for a short term is good, but it is considered that reliability is low under high temperature or long period vibrations.

In addition, in the case that the diameter of the caulked portion was not wider than $R_{body}-R_{top}=5$ mm, $\Delta R/R_{body}=10\%$ with respect to the diameter of the body part of the battery, no chasms, etc., appeared in the caulked portion, and good caulking could be executed, and it was found out that sealing performance of the battery was held extremely well. In addition, in the case that the battery case underwent sealing processing to reach $R_{body}-R_{top}=5.5$ mm, $\Delta R/R_{body}=11\%$, the pipe was broken at the time of caulking, resulting in occurrence of cracks, and was found out to be unable to function as a battery. This is considered to take place due to the reason that the battery case was deformed too much and became no longer tolerable on loads.

(Assessment 3)

As apparent from Table 3, in the lithium secondary battery where a battery case and electrode caps were welded as in FIG. 6(b), in Comparative example 6 and Comparative example 7 with $R_{body}-R_{top}=0$ mm, $\Delta R/R_{body}=0\%$, He leakage and liquid leakage were observed as a consequence. This also resulted from insufficient welding as in the cases of Comparative examples 3 and 4.

In addition, in the case that the diameter of the caulked portion was sized to reach $R_{body}-R_{top}=5$mm, $\Delta R/R_{body}=10\%$ with respect to the diameter of the body part of the battery as in Examples 9 to 12, good results were attained as in Examples 5 to 8. In addition, the case of Comparative embodiment 8 with the battery case which underwent sealing processing to reach $R_{body}-R_{top}=5.5$ mm, $\Delta R/R_{body}=11\%$, turned out to be unable to function as a battery as in Comparative embodiment 5.

So far, the present invention is an invention on a lithium secondary battery with a wound-type electrode body, but it goes without saying that the present invention is not limited by any other battery structures. Construction conditions on such lithium secondary battery of the present invention is suitably adopted for large-sized ones with battery capacity of 2 Ah or more. In addition, it goes without saying that application of the battery is not limited, but it can be in particular suitably used for starting an engine, or for an electric vehicle or a hybrid electric vehicle as a large capacity battery to be mounted on a vehicle requiring long period vibration resistance.

INDUSTRIAL APPLICABILITY

As having been described so far, in the present invention, improvement in long period stability and reliability can be planned by intensifying caulking between the battery case and the electrode cap and by removing caulked gaps between the battery case and the electrode cap so as to suppress leakage of electrolyte solution.

In addition, in the present invention, improvement in long period stability and reliability can be planned by intensifying caulking between the battery case and the electrode cap and by welding the tip portion of the battery case with the outer periphery portion of the electrode cap so as to suppress leakage of the electrolyte solution.

Moreover, in the present invention, manufacturing is simple, and improvement in productivity can be planned by making complicated operations such as joining operation, etc., inside the narrow battery case unnecessary and by using only selected good battery element for the subsequent steps.

What is claimed is:

1. A lithium secondary battery, comprising:
    a cylindrical battery case provided with electrode caps at both end portions;
    an electrode body contained in the battery case and including a positive electrode, a negative electrode, and a separator, the positive electrode and the negative electrode being wound or laminated through the separator; and
    an elastic body disposed between said battery case and at least one of said electrode caps with a portion where said battery case contacts said elastic body being brought into press-contact to form a caulked portion to seal said battery case,
    wherein $R_{body}$(mm) is a diameter of a body part of said battery case and $R_{top}$(mm) is a diameter of said caulked portion, and $R_{body}$ and $R_{top}$ fulfill a relationship of $R_{body}>R_{top}$, and wherein a difference between said $R_{body}$(mm) and said $R_{top}$(mm) is $\Delta R$(mm), and $\Delta R$ fulfills a relationship of $\Delta R \leq 5$(mm).

2. The lithium secondary battery according to claim 1, wherein said battery case comprises Al or Al alloy.

3. The lithium secondary battery according to claim 1, wherein said $R_{body}$ and said $\Delta R$ fulfill a relationship of $(\Delta R/R_{body}) \times 100 \leq 10(\%)$.

4. The lithium secondary battery according to claim 1, wherein a deformation quantity in a press-contacting direction of said press-contacted elastic body is larger than a spring-back quantity, and a press-contact force applied to said elastic body is not more than a press-contact force with an elasticity maintaining rate of said elastic body being not less than 95%.

5. The lithium secondary battery according to claim 1, wherein said elastic body comprises any of ethylene propylene rubber, polyethylene, polypropylene and fluororesin.

6. The lithium secondary battery according to claim 1, wherein at least one of said electrode caps comprises an electrolyte solution injection port.

7. The lithium secondary battery according to claim 1, wherein battery capacity is 2 Ah or more.

8. The lithium secondary battery according to claim 1 to be mounted on a vehicle.

9. The lithium secondary battery according to claim 8 for starting an engine.

10. The lithium secondary battery according to claim 8 for an electric vehicle or a hybrid electric vehicle.

11. A lithium secondary battery, comprising:
    a cylindrical battery case provided with electrode caps at both end portions; and
    an electrode body contained in the battery case and including a positive electrode, a negative electrode, and a separator, the positive electrode and the negative electrode being wound or laminated through the separator,
    wherein at least one portion where said battery case is in contact with said electrode caps is brought into press-contact to form a caulked portion and is welded to execute sealing,
    wherein $R_{body}$(mm) is a diameter of a body part of said battery case and $R_{top}$(mm) is a diameter of said caulked portion, and $R_{body}$ and $R_{top}$ fulfill a relationship of $R_{body}>R_{top}$, and wherein a difference between said $R_{body}$(mm) and said $R_{top}$(mm) is $\Delta R$(mm), and $\Delta R$ fulfills a relationship of $\Delta R \leq 5$(mm).

12. The lithium secondary battery according to claim 11, wherein said battery case comprises Al or Al alloy.

13. The lithium secondary battery according to claim 11, wherein said electrode caps comprise Al or Al alloy.

14. The lithium secondary battery according to claim 11, wherein said $R_{body}$ and said $\Delta R$ fulfill a relationship of $(\Delta R/R_{body}) \times 100 \leq 10(\%)$.

15. The lithium secondary battery according to claim 11, wherein a squeezed portion is formed in the very vicinity of an outer peripheral portion of said electrode caps.

16. The lithium secondary battery according to claim 11, wherein said battery case is shaped as a pipe.

17. The lithium secondary battery according to claim 11, wherein an entire area of tip portions of said battery case and said electrode cap are joined by said welding.

18. A manufacturing method of a lithium secondary battery, comprising the steps of:
    forming a battery element by joining respective electricity collection parts provided in both ends of an internal electrode body which is structured by winding a positive electrode and a negative electrode via a separator around the outer periphery of a winding core and respective internal terminal portions of two electrode caps;
    inserting said battery element into a battery case with both ends being left open;
    joining respective both end portions of said battery case with respective outer periphery portions of said two electrode caps;
    injecting electrolyte solution from an electrolyte solution injection port provided in at least one electrode cap; and
    sealing said electrolyte solution injection port.

19. The manufacturing method of a lithium secondary battery according to claim 18, wherein respective both end portions of said battery case and respective outer periphery portions of said two electrode caps are joined, and at the same time, or therebefore/thereafter said electrode cap of said battery case undergoes squeezing in the very vicinity portion of an outer periphery portion.

20. The manufacturing method of a lithium secondary battery according to claim 18, wherein a caulking and/or welding method is used as a method for joining said battery case and said electrode caps.

21. The manufacturing method of a lithium secondary battery according to claim 20, wherein, at the time of said caulking operation, an elastic body is arranged between said battery case and said electrode caps.

22. The manufacturing method of a lithium secondary battery according to claim 21, wherein said elastic body comprises any one of ethylene propylene rubber, polyethylene, polypropylene and fluororesin.

23. The manufacturing method of a lithium secondary battery according to claim 20, wherein, at the time of said welding operation, a YAG laser is used as an energy source.

24. The manufacturing method of a lithium secondary battery according to claim 18, wherein said battery case comprises any one of aluminum and aluminum alloy.

* * * * *